Patented June 5, 1945

2,377,577

UNITED STATES PATENT OFFICE 2,377,577

CATALYSTS AND PREPARATION THEREOF

Robert F. Ruthruff, Chicago, Ill.

No Drawing. Original application February 7, 1940, Serial No. 317,770. Divided and this application May 28, 1943, Serial No. 488,905

7 Claims. (Cl. 196—52)

The present invention relates to catalytic materials and methods for the preparation thereof. More particularly, the present invention relates to catalytic materials useful in accelerating the conversion of hydrocarbons of relatively low utility and value into hydrocarbons of higher utility and value and to methods for the preparation thereof.

This application is a division of my copending application, Serial Number 317,770, filed February 7, 1940, now U. S. Patent 2,320,799, issued June 1, 1943.

Briefly, the present invention relates to improved catalysts for the acceleration of various conversion reactions, said catalysts comprising a substrate of silica prepared from a natural siliceous material and further characterized by the fact that the substrate is obtained in the form of flakes, sheets or plates of little thickness and large area and hence exhibits a high surface to volume ratio.

One of the objects of my invention is the provision of catalysts of novel physical form for accelerating chemical reactions.

One other object of my invention is the provision of catalysts for the conversion of hydrocarbons of relatively low utility and value into hydrocarbons of higher utility and value, said catalysts being readily and economically prepared synthetically from a natural siliceous material, said catalysts being further characterized by the fact that they are obtained in the form of flakes, sheets or plates of little thickness and large area.

An additional object of my invention is the provision of catalysts for the conversion of hydrocarbons boiling above the usual gasoline range into hydrocarbons boiling within the usual gasoline range, said catalysts being readily and economically prepared synthetically from a natural siliceous material, said catalysts being further characterized by the fact that they are obtained in the form of flakes, sheets or plates of little thickness and large area.

A further object of my invention is the provision of catalysts for the conversion of olefines higher than ethylene into hydrocarbons boiling within the usual gasoline range, said catalysts being readily and economically prepared synthetically from a natural siliceous material, said catalysts being further characterized by the fact that they are obtained in the form of sheets, plates or flakes of little thickness and large area.

Various other objects and features of my invention will become apparent as the description thereof proceeds.

In the preparation of my improved catalysts the mineral most commonly known as vermiculite is employed as the natural source of the silica substrate. This mineral, which is also known under several varietal names such as jeffersite, is generally formed as the result of alteration of biotite, phlogopite or other varieties of mica. The vermiculites have a rather indefinite composition but numerous analyses indicate that the chemical constitution can be approximated by the formula:

$$22SiO_2 \cdot 22MgO \cdot 5Al_2O_3 \cdot 1Fe_2O_3 \cdot 40H_2O$$

Vermiculite occurs in the form of glistening black mica-like aggregates. It is believed that this material is built up of layers having unit cells of the approximate composition:

$$(MgFe)_3(AlSi)_4O_{10}(OH)_2 \cdot 4H_2O$$

each pair of sheets being separated by four molecules of water. On heating the mineral a most remarkable phenomenon occurs to which the term exfoliation has been applied. On exfoliation, vermiculite expands enormously, the volume increase being as great as sixteen fold so that a final product is produced having a bulk density of six pounds per cubic foot or less. Simultaneously, the color of the mineral changes, the exfoliated material being a beautiful glistening golden brown. Expansion during exfoliation is large unidirectional. The flat mica-like plates of the original material separate greatly as exfoliation proceeds while the area of the original mineral particle remains substantially unchanged. Exfoliation can best be compared with the expansion of an accordion. By applying pressure in the appropriate direction, the exfoliated particles can be compressed nearly to the original dimensions prior to exfoliation.

In United States Patent 1,898,774, issued February 21, 1933, to R. G. Guthrie and O. J. Wilbor, a process is described for producing practically pure silica in the form of very thin sheets, plates or flakes and exhibiting high absorptive and adsorptive properties by digesting vermiculite, either in the unprocessed state or after exfoliation, with strong mineral acids. I have discovered that excellent catalysts, especially catalysts for accelerating the conversion of hydrocarbons of relatively low value and utility into hydrocarbons of higher value and utility, can be prepared from such very thin sheets, flakes or plates of silica by suitably activating them with alumina, magnesia or similar promoters.

The catalysts prepared pursuant to my invention differ radically from natural occurring or acid treated clays of the bentonite or montmorillonite type and from the synthetic silica-alumina complexes which have heretofore been proposed for use in the aforementioned catalytic conversion processes. The catalysts of the prior art exist in a particulate or approximately sphere-like form having a low surface to volume ratio. Certain of the synthetic silica-alumina complexes which have a substrate of silica gel have, it is true, a large specific surface due to the presence of myriads of microscopic pores in the individual silica gel substrate particles. However, the advantages that should theoretically follow from such large specific surfaces are not realized in practice. This I attribute to two factors (1) slowness of diffusion of reactants or products and (2) sealing the microscopic pores by carbonaceous residues. In catalytic conversion processes it is axiomatic that for reaction to occur the reactant must reach the catalytic surface. In, for example, the conversion of hydrocarbons boiling above the usual gasoline range into hydrocarbons boiling within the usual gasoline range using a synthetic silica-alumina complex having a silica gel substrate as catalyst, and having a particulate or approximately spherical form, because of the high molecular weight of the reactants, diffusion into the pores of the substrate is extremely slow so that, in effect, the active portion of the catalyst corresponds approximately to the gross geometrical surface thereof. If, on the other hand, an attempt is made to convert a gaseous olefine higher than ethylene to a liquid hydrocarbon boiling within the gasoline range using a similar catalyst, the reactants, being of low molecular weight diffuse with comparative ease into the microscopic pores but the products, especially those traces of products boiling above the usual gasoline range, being of much higher molecular weight, leave the pores with slowness so that again, in effect, the active portion of the catalyst corresponds approximately to the gross geometrical surface thereof. Additionally, in all these hydrocarbon conversion processes, more or less carbonaceous residue of low hydrogen to carbon ratio is formed as byproduct. This carbonaceous residue effectively seals the microscopic pores of the catalysts of the prior art and prevents diffusion of reactants into or of products from the interior of the silica gel substrate.

It is seen that if the catalysts of the prior art, having a particulate or approximately spherical shape, could be rolled out into sheets, plates or flakes of great area and very little thickness many advantages would follow. I have discovered that highly active catalysts having this preferred physical form may be made by using as the silica substrate, the plates, sheets or flakes of silica obtained from vermiculite by the process previously indicated. For the better understanding of my invention several illustrative examples will now be given describing suitable methods for the preparation of said improved catalysts.

*Example 1*

One hundred parts by weight of unexfoliated vermiculite are covered with 330 parts by weight of 33% sulfuric acid and the reaction mixture is digested at the boiling point or slightly below for a period of six hours, more or less. At the start of the digestion process the vermiculite swells very appreciably although the volume increase is not nearly as great as is observed during exfoliation. Also, during the early stages of the digestion process the reaction proceeds with considerable vigor even without the application of heat. The purified flakes, sheets or plates of silica are then washed by decantation, filtration or otherwise. If desired, the solid may be washed one to three times with dilute acid, for example, 5 to 10% sulfuric acid followed by three to five washings with water and the final wet cake containing the purified and washed solids is added to a strong (30%) aqueous solution of magnesium nitrate hexahydrate. After standing for several hours or preferably over night, the solids are separated from the liquid, are dried slowly and are then calcined at a temperature of about 400 to 500° C. to form the final product.

It is obvious that the silica-magnesia catalyst prepared in accord with Example 1 may be made in ratios extending over a considerable range by varying the concentration of the salt solutions in which the purified and washed flakes, sheets or plates of silica are soaked. Catalysts of different silica-metal oxide ratios show somewhat differing activities when employed and while a certain ratio may result in optimum catalytic properties in one conversion process, another ratio may be preferable for use in a different conversion process. In general best results are obtained with silica-metal oxide complexes containing 20% or less metal oxide, preferably from 5 to 15% metal oxide.

While the purification of vermiculite by digesting with dilute sulfuric acid at or near the boiling point at atmospheric pressure is a perfectly satisfactory operation, if desired, the purification may be accomplished more rapidly by operating under higher temperature at correspondingly elevated pressure. Purification at elevated temperatures and pressures is especially effective when the massive mineral is being processed.

While the purification of vermiculite by treatment with sulfuric acid has been described in the example, it is obvious that any strong acid except hydrofluoric acid, may be used for the purpose; for example, nitric acid, hydrochloric acid or a mixture of the two (aqua regia).

It is seen that the prepartion of catalysts in accord with the above example involves two broad steps, (1) purification of the mineral and (2), activation of the resulting flakes, plates or sheets of silica by incorporation with magnesia. It is to be understood that while the massive mineral is processed in Example 1, if desired, exfoliated material may be treated as described in Example 1. In the purification of massive vermiculite, the opportunities for attack by the acid are comparatively limited as compared with those presented by exfoliated material. However the speed of purification of exfoliated vermiculite is not in proportion to the enhanced surface presented to the acid in comparison with the massive material. This is attributed to the fixing of alumina, magnesia, iron oxide, etcetera in the structure of the silica due to the elevated temperatures used in exfoliation. Accordingly, the massive mineral, while presenting comparatively little area to acid attack, contains impurities in a very labile state and hence purification is fairly rapid. On the other hand, while the impurities in exfoliated vermiculite are rather firmly bound to the silica, because of the large surface presented, purification is again fairly rapid. In general, somewhat more rapid purification and somewhat more active catalysts are obtained by starting with exfoliated material.

The final catalysts obtained by the procedures outlined above are in the form of plates, flakes or sheets of extreme thinness. In general this physical form is not suitable for most catalytic purposes. As has been explained in considerable detail in my copending application, Serial Number 313,898, filed January 15, 1940 now U. S. Patent 2,323,728, issued July 6, 1943, catalytic processes may be divided into three main groups with respect to the way of contacting catalyst and charge. These are:

1. Processes in which the catalyst is disposed in a stationary bed.
2. Processes in which the catalyst is moved continuously or intermittently through the reaction zone.
3. Processes in which the catalyst is suspended in the reactant and the suspension is then passed through the reaction zone.

For processes 1 and 2 catalysts in the form of flakes, plates or sheets are not particularly suitable, catalysts in the form of discrete particles of appreciable size are preferable. It is seen that the products formed in accord with the present invention are not particularly for use in these two processes. For process 3, small, easily suspended catalyst particles are desirable and it is seen that the catalyst formed in accord with the present invention is of ideal physical form for this purpose.

To render the catalysts formed in accord with the present invention suitable for use in the first two processes named these plates, flakes or sheets may be mechanically formed into aggregates constituting discrete particles by pelleting in a pill machine or by extrusion with or without a suitable binding material. One eminently suitable method for forming the small thin plates, flakes or sheets into aggregates constituting discrete particles comprises adding from 5 to 25%, preferably from 10 to 15% of bentonite clay to the finished but undried or only partially dried catalyst. After thorough mixing the whole is passed through an extrusion machine provided with a cutter to produce cylinders of any desired size which are then dried.

While the above example relates to catalysts comprising plates, sheets or flakes of silica in combination with magnesia, it is to be understood that this metal oxide may be replaced by other oxides, by elements or compounds. Among such other catalyst combinations may be mentioned plates, sheets or flakes of silica in combination with metallic silver. Such a combination is useful as a catalyst for promoting the oxidation of organic compounds. Another combination useful for similar reactions comprises plates, sheets or flakes of silica in combination with vanadium pentoxide formed as described in Example 1, substituting ammonium vanadate for magnesium nitrate. A catalyst combination useful in the dehydrogenation or desulfurizing of organic compounds comprises plates, flakes or sheets of silica in combination with chromium oxide prepared in accord with Example 1, ammonium dichromate, chromium nitrate or chromium trioxide being substituted for magnesium nitrate. Another combination useful in accelerating various organic oxidations comprises flakes, sheets or plates of silica in combination with manganese oxide made in accord with Example 1, manganese nitrate being substituted for magnesium nitrate. Plates, flakes or sheets of silica in combination with metallic platinum comprise a catalyst useful in promoting the union of sulfur dioxide and oxygen to form sulfur trioxide. An excellent catalyst for the polymerization of gaseous olefines higher than ethylene to liquid hydrocarbons boiling within the usual gasoline boiling range may be prepared by mixing one part by weight of plates, flakes or sheets of silica with 2 to 2.5 parts by weight of orthophosphoric acid and calcining the whole at about 300° C. until the mass solidifies.

To further illustrate the application of the catalysts of this invention, the following illustrative examples are given.

*Example 2*

A catalyst prepared in accord with Example 1 is thoroughly mixed with 10% untreated bentonite (the commercial variety known as Volclay bentonite being employed) and the mixture is extruded, the resulting spaghetti being cut so as to form cylinders which after drying are about ¼ inch in diameter and ¼ inch high. The resulting pellets are disposed in a suitable low pressure reactor and are contacted with the vapors of hydrocarbons boiling above the usual gasoline range by passing therethrough the vapors obtained from a Mid-Continent gas oil having an A. S. T. M. initial of 482° F. and an A. S. T. M. endpoint of 748° F. and an A. P. I. gravity of 35.4°. The gas oil charge is heated to a temperature in the range 825–950° F., is vaporized, and passed over the catalyst at a rather low pressure, 50 pounds per square inch. As much as 60% of the charge is converted to liquid hydrocarbons boiling within the usual gasoline range, the exact amount of conversion obtained in various experiments depending upon the operating temperature and contact time employed. The contact time may vary from that obtained by passing the charge to the reactor at a rate of 0.5 volume of charge (measured as liquid) per hour per volume of catalyst space to 2.0 volumes per hour per volume, more or less.

*Example 3*

Catalyst pellets prepared in accord with Example 2 are disposed in a suitable low pressure reactor. Heavy naphtha from Mid-Continent crude, having an approximate boiling range of from 250 to 400° F. is vaporized and passed through the catalyst at a rate of from 1.0 to 4.0 volumes of charge (measured as liquid) per hour per volume of catalyst space. The portion of the product formed that falls within the usual light naphtha boiling range exhibits a motor knock rating of from 78 to 80. The yield of this product depends upon the operating temperature and the time of contact. Operating temperatures may be within the range 825 to 925° F. Particularly good results are obtained at a flow rate of 1.0 (as previously defined) and an operating temperature of 850° F.

While specific details for the preparation of the improved catalysts of the instant invention have been described by means of numerous examples, it is to be understood that these are illustrative only and are in no way to be construed as limiting the scope of the instant invention except insofar as these specific details are included in the appended claims.

I claim:

1. In the production of catalysts, the step including uniting substantially flat, highly adsorptive plates, sheets or flakes of silica obtained from vermiculite by treating said mineral with acid, with magnesia.

2. In the preparation of catalysts, the step including uniting substantially flat, highly adsorptive plates, sheets or flakes of silica obtained from vermiculite by treating said mineral with sulfuric acid, with magnesia.

3. A catalyst comprising a substrate of substantially flat highly adsorptive plates, flakes or sheets of substantially pure silica united with magnesia.

4. A process of converting hydrocarbons of relatively low value and utility into hydrocarbons of higher value and utility comprising contacting said hydrocarbons of relatively low value and utility at conversion temperature with a catalyst comprising a substrate of substantially flat, highly adsorptive plates, flakes or sheets of silica obtained from vermiculite by treating said mineral with acid, united with magnesia.

5. A process of converting hydrocarbons of relatively low value and utility into hydrocarbons of higher value and utility comprising contacting said hydrocarbons of relatively low value and utility at conversion temperature with a catalyst comprising a substrate of substantially flat, highly adsorptive plates, flakes or sheets of silica obtained from vermiculite by treating said mineral with sulfuric acid, united with magnesia.

6. A process of converting hydrocarbons boiling above the usual gasoline range into hydrocarbons boiling within the usual gasoline range comprising contacting said hydrocarbons boiling above the usual gasoline range at conversion temperature with a catalyst comprising a substrate of substantially flat, highly absorptive plates, flakes or sheets of silica obtained from vermiculite by treating said mineral with acid, united with magnesia.

7. A process for converting hydrocarbons boiling above the usual gasoline range into hydrocarbons boiling within the usual gasoline range comprising contacting said hydrocarbons boiling above the usual gasoline range at conversion temperature with a catalyst comprising a substrate of substantially flat, highly adsorptive plates, flakes or sheets of silica obtained from vermiculite by treating said mineral with sulfuric acid, united with magnesia.

ROBERT F. RUTHRUFF.